US010592283B2

(12) United States Patent
Chakra et al.

(10) Patent No.: US 10,592,283 B2
(45) Date of Patent: Mar. 17, 2020

(54) COLLABORATIVE DISTRACTION MITIGATION

(71) Applicant: International Business Machines Corporation, Armonk, NY (US)

(72) Inventors: Al Chakra, Apex, NC (US); Jonathan Dunne, Dungarvan (IE); Liam S. Harpur, Dublin (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/819,821

(22) Filed: Nov. 21, 2017

(65) Prior Publication Data

US 2019/0155647 A1    May 23, 2019

(51) Int. Cl.
*G06F 9/48* (2006.01)
*G06F 9/50* (2006.01)

(52) U.S. Cl.
CPC ............ *G06F 9/4887* (2013.01); *G06F 9/485* (2013.01); *G06F 9/5011* (2013.01)

(58) Field of Classification Search
None
See application file for complete search history.

(56) References Cited

U.S. PATENT DOCUMENTS

| 8,201,108 | B2 | 6/2012 | Chen et al. |
| 8,732,291 | B2* | 5/2014 | Zhu ...................... H04L 67/303 709/217 |
| 8,825,304 | B2 | 9/2014 | Horvitz et al. |
| 8,886,976 | B2 | 11/2014 | Jiang et al. |
| 9,940,844 | B2* | 4/2018 | Gazzaley ............... A61B 5/162 |
| 2008/0178105 | A1 | 7/2008 | Loewenstein |
| 2013/0297599 | A1 | 11/2013 | Henshall |
| 2014/0149164 | A1 | 5/2014 | Yumbe et al. |
| 2016/0262680 | A1* | 9/2016 | Martucci ................ A61B 5/162 |
| 2017/0249574 | A1* | 8/2017 | Knijnik ............ G06Q 10/06313 |
| 2017/0249855 | A1 | 8/2017 | Gazzaley |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Van H Nguyen
(74) *Attorney, Agent, or Firm* — Kristofer L. Haggerty

(57) ABSTRACT

A computer-implemented method mitigates distractions that are provided by a computer system in order to improve an overall functionality of the computer system. One or more processors identify a task T that has a completion deadline, where task T is performed on a computer system. The processor(s) identify one or more activities At that are required to complete task T, as well as a dedicated focus of attention time Ft that is required of a user to perform the activities At. The processor(s) monitor activities of the user to determine a focus of attention time Fi for each activity Ai performed by the user, and accumulate the focus of attention time Fi for activities into a bucket for Ft and a bucket not for Ft. The processor(s) then alter a functionality of the computer system in order to improve an overall functionality of the computer system when performing task T.

20 Claims, 6 Drawing Sheets

(56) References Cited

U.S. PATENT DOCUMENTS

2018/0261115 A1* 9/2018 Gazzaley ............... A61B 5/162

OTHER PUBLICATIONS

Jessica Hamzelou, "Easily Distracted People May Have Too Much Brain". New Scientist Magazine, May 14, 201t Web Jul. 11, 2016. <https://www.newscientist.com/article/dn20453-easily-distracted-people-may-have-too-much-brain/>.

David Rock, "Easily Distracted: Why Its Hard to Focus, and What to Do About It". Sussex Publishers, LLC, Psychology Today, Oct. 4, 2009. Web Jul. 11, 2016. <https://www.psychologytoday.com/blog/your-brain-work/200910/easily-distracted-why-its-hard-focus-and-what-do-about-it>.

Heather Whipps, "Study Reveals Why We Get Distracted So Easily". Purch, Live Science, Mar. 29, 2007. Web Jul. 11, 2016. <http://www.livescience.com/7238-study-reveals-distracted-easily.html>.

* cited by examiner

| TASK | APPLICATION | MOUSE TX PER MINUTE | KEYSTROKE TX PER MINUTE | VOIP INTERRUPTION |
|---|---|---|---|---|
| EMAIL CREATION | EMAIL APPLICATION | 34 | 67 | N/A |
| COLLABORATIVE DOCUMENT | DOC SHARING APPLICATION | 68 | 59 | N/A |
| VIDEO CONFERENCE | WEB-BASED VIDEO APPLICATION | 17 | 20 | 16 |

FIG. 3

COLLABORATIVE DISTRACTION MITIGATION

BACKGROUND

The present invention relates to the field of computers, and particularly to computers that provide resources for performing tasks. Still more particularly, the present invention relates to mitigating distractions that a computer system may provide to a user who is performing a certain task.

SUMMARY

In one or more embodiments of the present invention, a computer-implemented method mitigates distractions that are provided by a computer system in order to improve an overall functionality of the computer system. One or more processors identify a task T that has a completion deadline, where task T is performed on a computer system. The processor(s) identify one or more activities At that are required to complete task T, as well as a dedicated focus of attention time Ft that is required of a user to perform the one or more activities At in order to meet the completion deadline. The processor(s) monitor activities of the user to determine a focus of attention time Fi for each activity Ai performed by the user, where the activities include both the one or more activities At that are required to complete task T and distraction activities that are unrelated to task T. The processor(s) accumulate the focus of attention time Fi for activities into a bucket for Ft and a bucket not for Ft, where the focus of attention time Fi for activities related to task T are placed into the bucket for Ft, and where the focus of attention time Fi for the distraction activities that are unrelated to task T are placed in the bucket not for Ft. The processor(s) compare the bucket for Ft to the bucket not for Ft in order to determine a distraction assessment of one or more distractions from performing task T. In response to determining the distraction assessment meets a distraction criteria, the processor(s) alter a functionality of the computer system in order to improve an overall functionality of the computer system when performing task T.

The described invention may also be implemented in a computer system and/or as a computer program product.

BRIEF DESCRIPTION OF THE DRAWINGS

FIG. 3 depicts a table showing a user's current activities relative to his/her activity stream/workflow;

DETAILED DESCRIPTION

Figure 1:
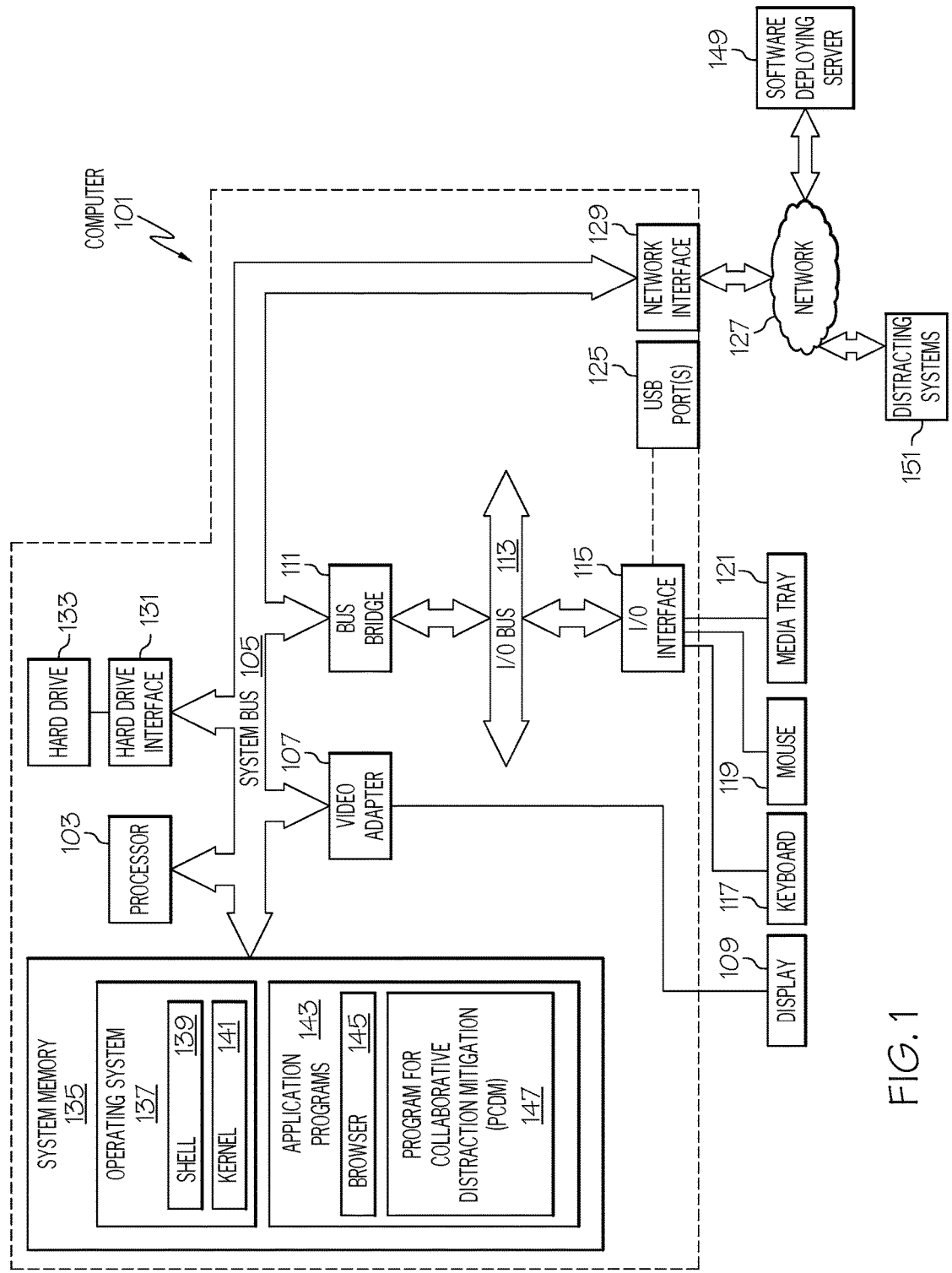
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

People are often easily distracted to one degree or another. For example, a person may have a tight deadline for performing a task, and initially have a well-defined focus. However, after a while, this person's attention/focus may drift to other thoughts/activities, making it difficult to return to the original task after drifting to the other thoughts/activities.

Thus, one or more embodiments of the present invention present a system that is aware of a user's current collaborative activity stream; monitors the users current collaboration activity in real-time; and then, based on real-time statistical analysis, derives a distraction quotient, which is used to alert the user of their current level of distraction, guide a set of recommendations to get an individual back on track, and/or modify the computer system such that the distractions are no longer available.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or distracting systems 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Collaborative Distraction Mitigation (PCDM) 147. PCDM 147 includes code for implementing the processes described below, including those described in FIGS. 2-4. In one embodiment, computer 101 is able to download PCDM 147 from software deploying server 149, including in an on-demand basis, wherein the code in PCDM 147 is not downloaded until needed for execution. In one embodiment of the present invention, software deploying server 149 performs all of the functions associated with the present invention (including execution of PCDM 147), thus freeing computer 101 from having to use its own internal computing resources to execute PCDM 147.

Distracting systems 151 are systems that distract a user away from performing a current task. Examples of such distracting systems 151 are webpage servers that serve webpages that are unrelated to the current task; videoconferencing servers that serve video meetings that are unrelated to the current task; email servers that serve emails that are unrelated to the current task; telecommunication servers (e.g., voice over internet protocol—VoIP servers) that send phone calls that are unrelated to the current task; etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

In the course of completing a set task, all people have occasions when they tune out from the current task (i.e., lose their focus on a task and think about other things, pull up unrelated content from the Internet, etc.). Once a person tunes out from a task, it can be difficult to get back on track with that task. Additionally, a person may be so immersed in their distraction that they are not aware that they are in this distracted state. Such a person often repeats these behaviors time and time again, thus creating poor work habits.

In order to address these problems, one or more embodiments of the present invention provide a system that 1) is aware of a user's current collaborative activity stream; 2) monitors the user's current collaboration activity in real-time; 3) derives, based on a real-time statistical analysis, a distraction quotient that is used to alert the user to their current level of distraction; guide a set of recommendations to get an individual back on track; and modify a functionality of a computer system that provided such distractions.

Thus, the modified system does not allow a user to "escape to" a distraction, which not only affects the effectiveness of the user, but also affects the efficiency of the computer system. That is, if the computer system is utilizing resources pulling up websites, VoIP calls, video conferences, videos, social media postings, etc., all of which are unnecessary for and unrelated to a current task being performed by a user, then the computer's resources are being wasted. By removing these distractions, the computer system only activates resources that are related to the task at hand, thereby improving the overall efficiency of the computer system.

In one embodiment of the present invention, the computer system auto-generates a "to do" list of sub-tasks related to the current task, thus getting the user back on track to the original task, and allowing the computer to conserve its resources by providing only those resources needed to perform the current task.

Thus, and as described in one or more embodiments, the present invention monitors activities of a user in order to determine a focus of attention time (Fi) for each activity (Ai), and then calculating a distraction level/percentage by comparing focus of attention time (Fi) and not in focus of attention time (Fi) of each activity. This allows the system to 1) alert the user their current level of distraction; 2) guide the user with a set of recommendations in order to get an individual back on track; and 3) modify the computer itself such that the distractions are no longer presented to the user.

Figure 2:
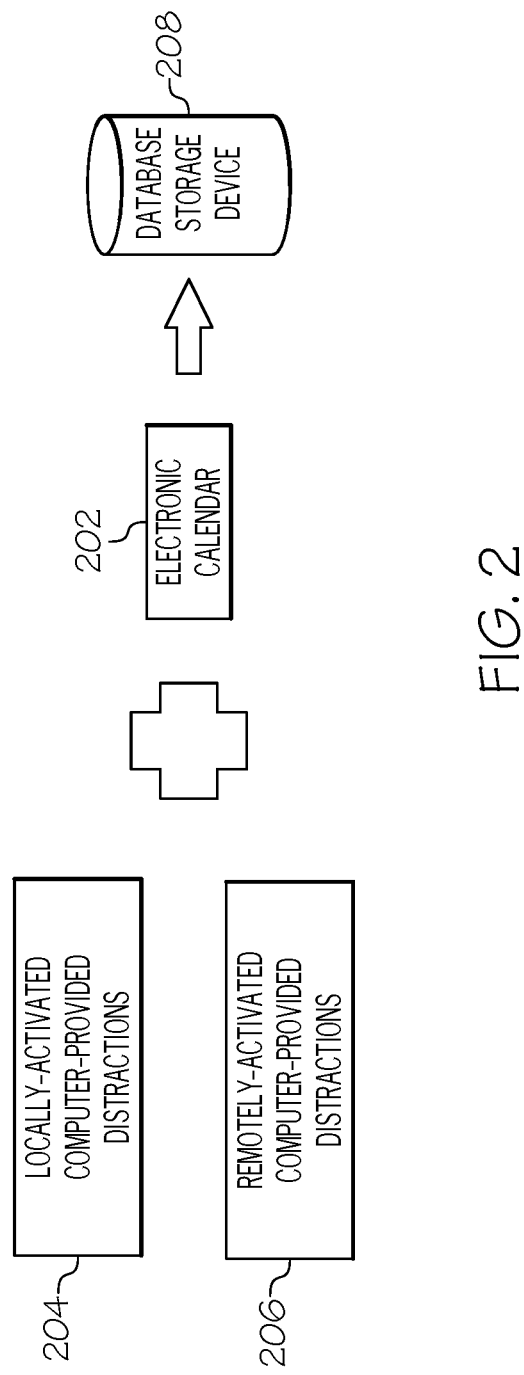
FIG. 2 illustrates exemplary distractions to a task that a computer may make available to a user.

With reference now to FIG. 2, assume that a user has a certain task on his/her electronic calendar 202 (e.g., part of PCDM 147 shown in FIG. 1). The entry on electronic calendar 202 will let the system (e.g., computer 101) know 1) the subject of the task and 2) when the task is to be performed.

For example, assume that the task entry in electronic calendar 202 states "Write an email that describes a grant proposal for Research Project X", and shows that this task is to be performed between 9:00 a.m. and 3:00 p.m. on a particular date. As such, the system will retrieve a lookup table (also part of PCDM 147) that shows what resources are needed to draft this email. That is, the system will know that the email application is needed to be open, and will also know what other resources (e.g., text documents related to Research Project X, webpages related to Research Project X, databases related to Research Project X, a graphic program needed to describe Research Project X, etc.) will be needed to draft this email. Other resources that are not found in this lookup table (e.g., webpages related to sporting events, assuming that Research Project X is not related to sporting events) will be blocked to the user during the time period at which the email is scheduled to be written by the user.

These distractions may be locally-activated or remotely-activated. For example, locally-activated computer-provided distractions 204 (e.g., which may be provided internally by computer 101 shown in FIG. 1) may be a website that the local user is able to view, but should not, since it is unrelated to the task at hand.

Similarly, remotely-activated computer-provided distractions 206 (e.g., which may be provided by distracting systems 151 shown in FIG. 1) may be incoming VoIP phone calls, social media postings, emails, video conferences, etc. that are not related to the current task at hand, and thus should be hidden (e.g., blocked, but cached for later retrieval) from the user while working on the current project.

Thus, locally-activated computer-provided distractions 204 and/or remotely-activated computer-provided distractions 206 may be determined by the lookup table described above, or they may be manually defined by the user. In either embodiment, the distractions (204/206), along with the details about the task found in the electronic calendar 202, are stored in a database storage device 208 for use by the system (e.g., computer 101).

The system uses information (such as that found in table 301) to generate a distraction quotient—DQ for a particular user when that particular user is performing a particular task. For example, consider the following regression model used to create DQ while a user is drafting an email:

$$DQ\text{-}Email=0.345(Task)+0.124(Application)+0.567(Mouse)+0.111(Key)+0.456(Appswitch)$$

The value of "0.345" indicates that the task of writing an email has a certain value that indicates how significant distractions are. For example, if the user is simply watching a video conference, then this value would likely be lower (e.g., 0.125), since multitasking during a video conference is a minor distraction.

The value of "0.124" indicates that the application "Email application" is only moderately affected when other activities occur (e.g., an incoming VoIP phone call).

The value of "0.567" indicates that clicking a mouse frequently is not a frequent function used when writing an email, and thus the value of 34 mouse clicks per minute is a strong indicator that the user is being distracted by a video game, surfing the Internet, etc.

The value of "0.111" is an inverse value. That is, if the user is only typing a few words per minute (as indicated by the text keystrokes per minute of 67 shown in table 301), then this indicates to the system that the user is not typing much.

The value of "0.456" is relatively high, since the user has received 16 VoIP phone calls while typing the email, indicating a high number of remotely-activated computer provided distractions 206.

The regressive formula for DQ-Email thus generates a value of 0.345+0.124+0.567+0.111+0.456=1.603. If the system has predetermined that any DQ over 1.000 for a user when writing an email is problematic, then corrective steps (described below) are taken.

Figure 4:
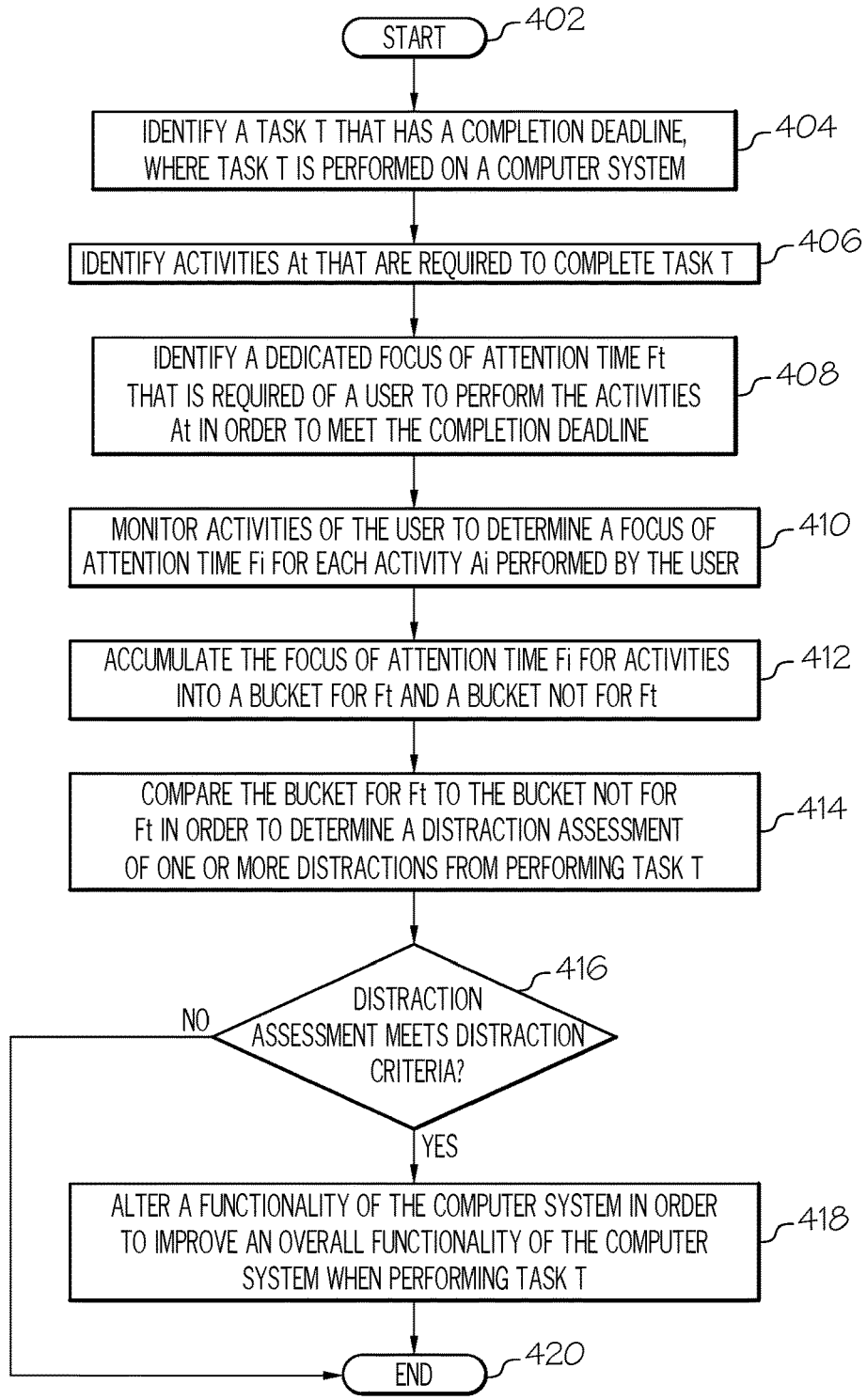
FIG. 4 is a high-level flow chart of one or more steps performed, by one or more processors and/or other hardware devices, in one or more embodiments of the present invention.

With reference now to FIG. 4, a high-level flow chart of one or more steps performed by one or more processors and/or other hardware devices to mitigate distractions that are provided by a computer system is presented.

After initiator block 402, one or more processors (e.g., processor 103 shown in FIG. 1) identify a task T that has a completion deadline, as described in block 404. This task T is performed on a computer system (e.g., computer 101) by a user (e.g., the person who has scheduled this task on his/her electronic calendar 202 shown in FIG. 2).

As described in block 406, one or more processors identify one or more activities At that are required to complete task T. For example, if task T is to write an email about requesting a research grant for a particular research project, then activities At may be retrieving past data about this particular research project, exchanging emails with other partners who have worked or will be working on the research project, etc.

As described in block 408, one or more processors identify a dedicated focus of attention time Ft that is required of a user to perform the one or more activities At in order to meet the completion deadline (e.g., the scheduled time shown in the electronic calendar 202).

As described in block 410, one or more processors monitor activities of the user to determine a focus of attention time Fi for each activity Ai performed by the user, where the activities include both the one or more activities At that are required to complete task T and distraction activities that are unrelated to task T. That is, the system monitors activities that the particular user is engaged in on the computer. Some will be related to the task at hand ("activities At that are required to complete task T", such as pulling up data related to a particular project that is the basis of the email being drafted) while others are unrelated to the task at hand ("activities At that are unrelated to task T", such as surfing video sharing websites to watch entertaining videos that have nothing to do with the task at hand).

As described in block 412, one or more processors accumulate the focus of attention time Fi for activities into a bucket for Ft and a bucket not for Ft, where the focus of attention time Fi for activities related to task T are placed into the bucket for Ft, and where the focus of attention time Fi for the distraction activities that are unrelated to task T are placed in the bucket not for Ft. That is, the system stores the time that is being spent on the project at hand in the "bucket for Ft" and stores time that is being spent on distractions in the "bucket not for Ft".

As described in block 414, one or more processors compare the bucket for Ft to the bucket not for Ft in order to determine a distraction assessment of one or more distractions from performing task T.

As shown in query block 416, a determination is made as to whether distraction assessment (e.g., DQ-Email discussed above) has a value that meets a distraction criteria (e.g., is greater than the predefined value of 1.000 in the use case above).

If so (query block 416), then one or more processors alter a functionality of the computer system in order to improve an overall functionality of the computer system when performing task T, as described in block 418.

For example, and in one embodiment of the present invention, altering the functionality of the computer system includes disabling functions of the computer system that perform the distraction activities, such that the functions of the computer system that perform the distraction activities are disabled while a user is performing task T. For example, if the user is being distracted by accessing a particular webpage URL related to a topic that has nothing to do with the task at hand, then the system will block the browser on the user's computer from accessing that particular webpage URL.

The flow-chart shown in FIG. 4 ends at terminator block 420.

In an embodiment of the present invention, the one or more processors provide a notification to the user of 1) the one or more distractions and/or 2) their level of distraction and/or 3) their impact on the task at hand. For example, assume that the user is working on a certain project (e.g., writing an email), but is being distracted by watching unrelated videos at a particular URL. The system can (based on the calculated distraction quotient—DQ discussed above exceeding some predefined level) 1) show an alert on the user's display that his/her distraction level is too high. This distraction level 2) can be quantified (based on the DQ) in order to generate/display a message that indicates a specific distraction level (e.g., "You are only giving 50% of your attention to the task at hand"). Based on the values used to generate DQ, the system can further 3) present a message to the user such as "Your efficiency will be increased by 25% if you do not watch unrelated videos at the particular URL".

In a preferred embodiment, the present invention modifies the computer being used by the user, such that the user is prompted into focusing on the task at hand. For example, assume that the distractions are on-line communications with others (e.g., VoIP phones calls, social media posting alerts, web conferences, etc.) that are unrelated to the task at hand. That is, PCDM 147 will compare the topic of the email being generated (based on the entry in electronic calendar 202), and will then block any on-line communications that are known to be unrelated to the task at hand while the user is performing task T. For example, the user may enter phone numbers and/or email addresses and/or other information for entities that need to be involved with the task at hand (writing an email) in the entry in the electronic calendar 202, which are stored in the database storage device 208. If a phone call or email or other electronic communication arrives at the user's computer from a party that is not identified in the entry in the electronic calendar 202, then that electronic communication is blocked from the user (e.g., hidden from the user and/or stored for later transmission to the user after the time period scheduled to perform the particular task is over).

In one embodiment of the present invention, the functionality of the computer system is altered not only by blocking distractions, but also be enabling needed resources. That is, altering the functionality of the computer system includes activating, on the computer system, a resource needed to perform task T. For example, if the entry on the electronic calendar 202 shows that the user will be writing an email about a grant proposal for "Research Project X" between 9:00 a.m. and 3:00 p.m., then the system will display an icon that, when clicked, will pull up and display research data related to Research Project X (e.g., experimentation results of earlier iterations of Research Project X), which can then be used when writing the email.

Thus, the system will not only activate, on the computer system, a resource needed to perform task T (e.g., starts a database program and locates the needed data), but also displays an interface to the resource (e.g., a clickable icon) that is needed to perform task T.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
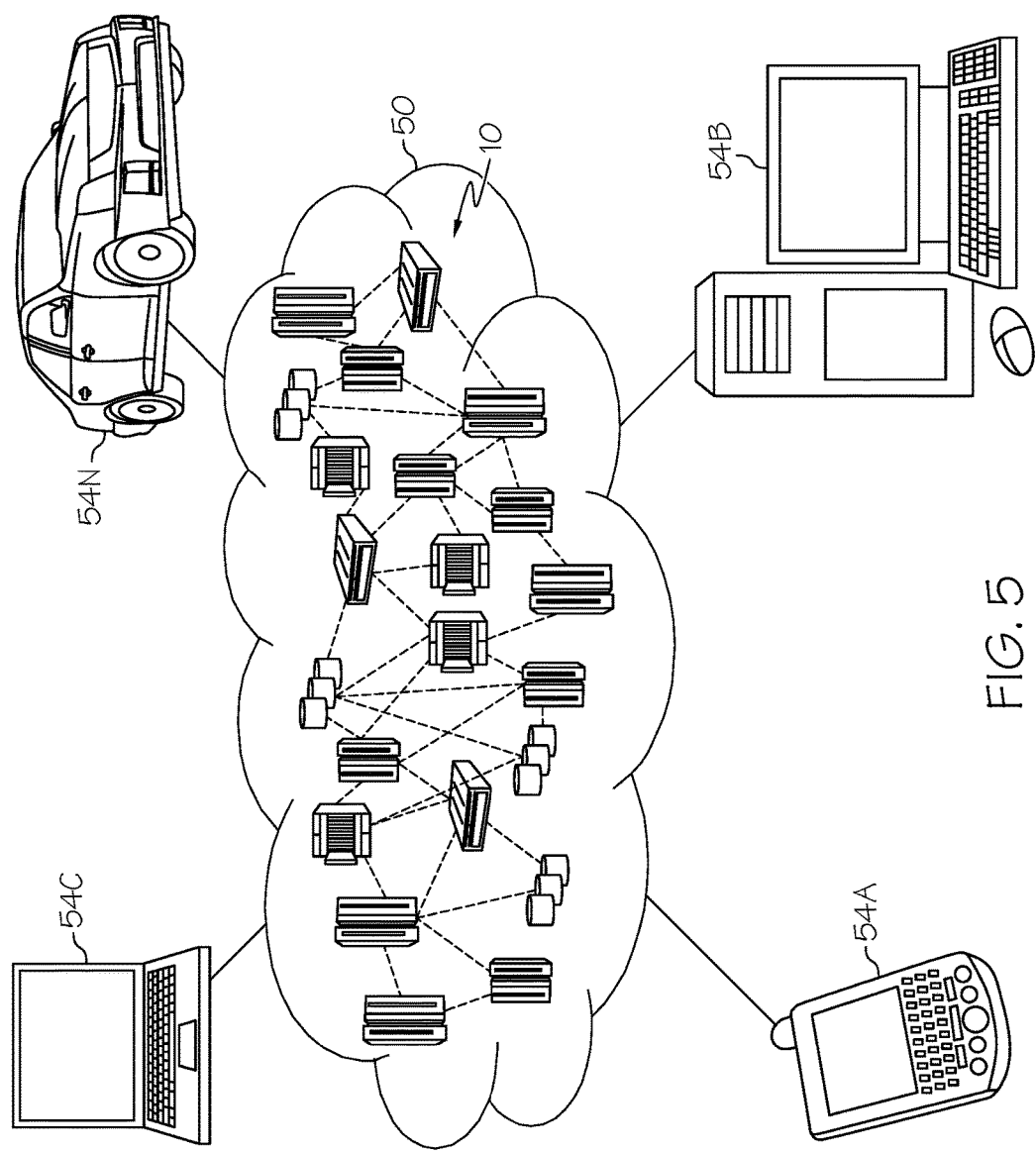
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
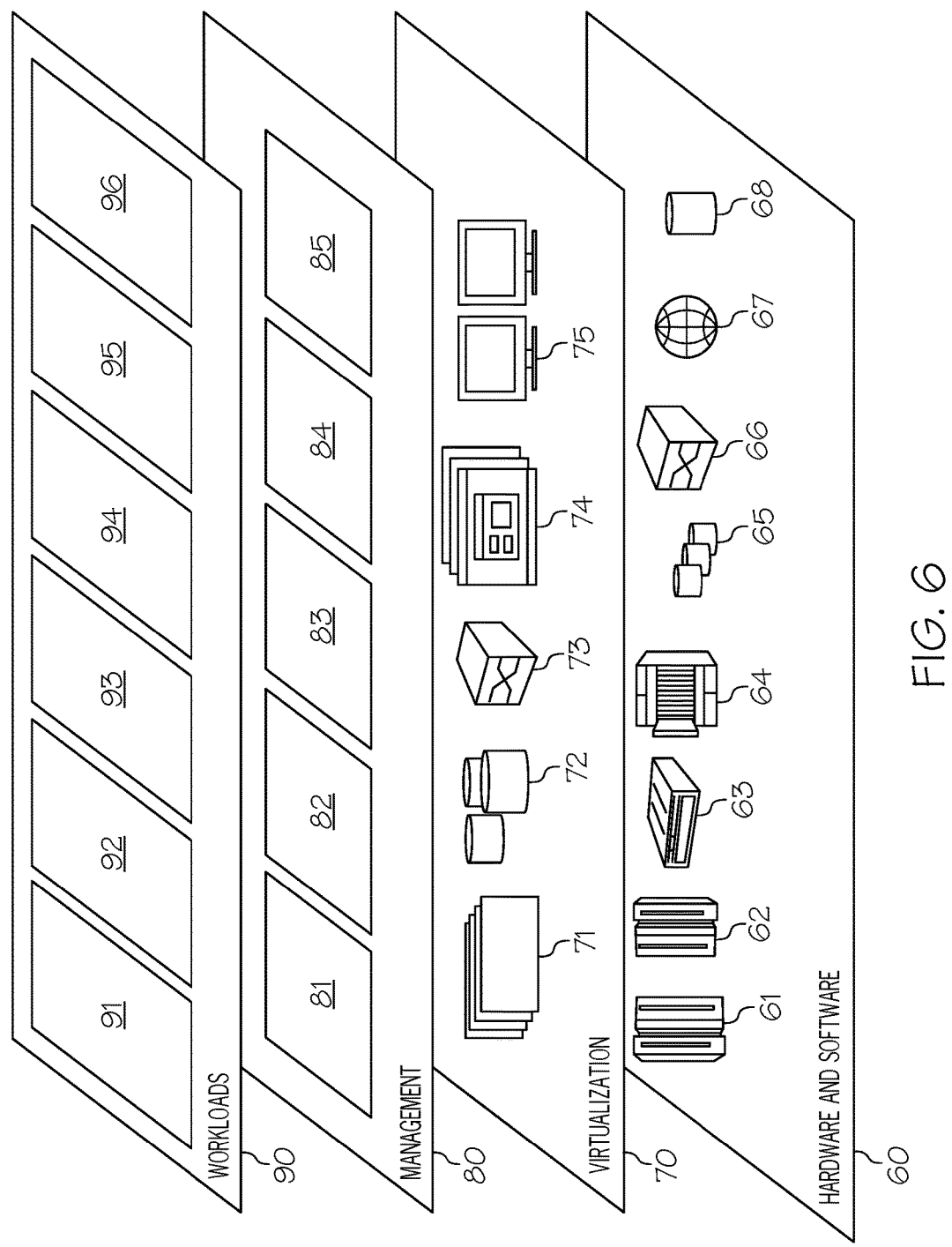
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative distraction mitigation processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for mitigating distractions that are provided by a computer system, the computer-implemented method comprising:

identifying, by one or more processors, a task T that has a completion deadline, wherein the task T is performed on the computer system;

identifying, by the one or more processors, one or more activities At that are required to complete the task T;

identifying, by the one or more processors, a dedicated focus of attention time Ft that is required of a user to perform the one or more activities At in order to meet the completion deadline;

monitoring, by the one or more processors, activities of the user to determine a focus of attention time Fi for each activity Ai performed by the user, wherein the activities include both the one or more activities At that are required to complete the task T and distraction activities that are unrelated to the task T;

accumulating, by the one or more processors, the focus of attention time Fi for activities into a bucket for Ft and a bucket not for Ft, wherein the focus of attention time Fi for activities related to the task T are placed in the bucket for Ft, and wherein the focus of attention time Fi for the distraction activities that are unrelated to the task T are placed in the bucket not for Ft;

comparing, by the one or more processors, the bucket for Ft to the bucket not for Ft in order to determine a distraction assessment of one or more distractions from performing the task T; and in response to determining the distraction assessment meets a distraction criteria, altering, by the one or more processors, a functionality of the computer system by disabling one or more functions the computer system when performing the task T.

2. The computer-implemented method of claim 1, wherein altering the functionality of the computer system comprises disabling functions of the computer system that perform the distraction activities, wherein the functions of the computer system that perform the distraction activities are disabled while the user is performing the task T.

3. The computer-implemented method of claim 1, further comprising:
providing, by the one or more processors, an electronic notification to the user of the one or more distractions.

4. The computer-implemented method of claim 1, wherein the one or more distractions are on-line communications with others, and wherein altering the functionality of the computer system comprises:
disabling, by the one or more processors, the on-line communications with others while the user is performing the task T.

5. The computer-implemented method of claim 1, wherein altering the functionality of the computer system comprises:
activating, on the computer system, a resource needed to perform the task T.

6. The computer-implemented method of claim 5, wherein altering the functionality of the computer system further comprises:
displaying, on the computer system, an interface to the resource needed to perform the task T.

7. A computer program product for mitigating distractions that are provided by a computer system, the computer program product comprising a non-transitory computer readable storage device having program instructions embodied therewith, the program instructions readable and executable by a computer to perform a method comprising:
identifying a task T that has a completion deadline, wherein the task T is performed on the computer system;
identifying one or more activities At that are required to complete the task T;
identifying a dedicated focus of attention time Ft that is required of a user to perform the one or more activities At in order to meet the completion deadline;
monitoring activities of the user to determine a focus of attention time Fi for each activity Ai performed by the user, wherein the activities include both the one or more activities At that are required to complete the task T and distraction activities that are unrelated to the task T;
accumulating the focus of attention time Fi for activities into a bucket for Ft and a bucket not for Ft, wherein the focus of attention time Fi for activities related to the task T are placed in the bucket for Ft, and wherein the focus of attention time Fi for the distraction activities that are unrelated to the task T are placed in the bucket not for Ft;
comparing the bucket for Ft to the bucket not for Ft in order to determine a distraction assessment of one or more distractions from performing the task T; and
in response to determining the distraction assessment meets a distraction criteria, altering a functionality of the computer system by disabling one or more functions of the computer system when performing the task T.

8. The computer program product of claim 7, wherein altering the functionality of the computer system comprises disabling functions of the computer system that perform the distraction activities, wherein the functions of the computer system that perform the distraction activities are disabled while the user is performing the task T.

9. The computer program product of claim 7, wherein the method further comprises:
providing an electronic notification to the user of the one or more distractions.

10. The computer program product of claim 7, wherein the one or more distractions are on-line communications with others, and wherein altering the functionality of the computer system comprises:
disabling the on-line communications with others while the user is performing the task T.

11. The computer program product of claim 7, wherein altering the functionality of the computer system comprises:
activating, on the computer system, an electronic resource needed to perform the task T.

12. The computer program product of claim 11, wherein altering the functionality of the computer system further comprises:
displaying, on the computer system, an interface to the resource needed to perform the task T.

13. The computer program product of claim 7, wherein the program instructions are provided as a service in a cloud environment.

14. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to identify a task T that has a completion deadline, wherein the task T is performed on the computer system;
program instructions to identify one or more activities At that are required to complete the task T;
program instructions to identify a dedicated focus of attention time Ft that is required of a user to perform the one or more activities At in order to meet the completion deadline;
program instructions to monitor activities of the user to determine a focus of attention time Fi for each activity Ai performed by the user, wherein the activities include both the one or more activities At that are required to complete the task T and distraction activities that are unrelated to the task T;
program instructions to accumulate the focus of attention time Fi for activities into a bucket for Ft and a bucket not for Ft, wherein the focus of attention time Fi for activities related to the task T are placed in the bucket for Ft, and wherein the focus of attention time Fi for the distraction activities that are unrelated to the task T are placed in the bucket not for Ft;

program instructions to compare the bucket for Ft to the bucket not for Ft in order to determine a distraction assessment of one or more distractions from performing the task T; and program instructions to, in response to determining the distraction assessment meets a distraction criteria, alter a functionality of the computer system by disabling one or more functions of the computer system when performing the task T.

15. The computer system of claim 14, wherein altering the functionality of the computer system comprises disabling functions of the computer system that perform the distraction activities, wherein the functions of the computer system that perform the distraction activities are disabled while the user is performing the task T.

16. The computer system of claim 14, further comprising:
program instructions to provide an electronic notification to the user of the one or more distractions.

17. The computer system of claim 14, wherein the one or more distractions are on-line communications with others, and wherein altering the functionality of the computer system comprises:
disabling the on-line communications with others while the user is performing the task T.

18. The computer system of claim 14, wherein altering the functionality of the computer system comprises:
activating, on the computer system, a resource needed to perform the task T.

19. The computer system of claim 18, wherein altering the functionality of the computer system further comprises:
displaying, on the computer system, an interface to the resource needed to perform the task T.

20. The computer system of claim 14, wherein the program instructions are provided as a service in a cloud environment.

* * * * *